(12) United States Patent
Kastner et al.

(10) Patent No.: US 9,501,935 B2
(45) Date of Patent: Nov. 22, 2016

(54) INTELLIGENT FORWARD COLLISION WARNING SYSTEM

(71) Applicant: HONDA MOTOR CO., LTD., Minato-Ku, Tokyo (JP)

(72) Inventors: Robert Kastner, Offenbach/Am Main (DE); Marcus Kleinehagenbrock, Offenbach/Am Main (DE); Morimichi Nishigaki, Offenbach/Am Main (DE); Hiroyuki Kamiya, Wako (JP); Shunsuke Kusuhara, Wako (JP); Naoki Mori, Wako (JP); Jens Schmudderich, Offenbach/Am Main (DE); Sven Rebhan, Offenbach/Am Main (DE)

(73) Assignee: Honda Motor Co., Ltd., Tokyo (JP)

( * ) Notice: Subject to any disclaimer, the term of this patent is extended or adjusted under 35 U.S.C. 154(b) by 64 days.

(21) Appl. No.: 14/333,632

(22) Filed: Jul. 17, 2014

(65) Prior Publication Data
US 2015/0025784 A1    Jan. 22, 2015

(30) Foreign Application Priority Data
Jul. 19, 2013  (DE) .......................... 10 2013 214 233

(51) Int. Cl.
*G08G 1/16* (2006.01)
*B60W 30/09* (2012.01)

(52) U.S. Cl.
CPC .............. *G08G 1/167* (2013.01); *B60W 30/09* (2013.01); *G08G 1/166* (2013.01)

(58) Field of Classification Search
CPC ...... G08G 1/167; G08G 1/166; B60W 30/09
See application file for complete search history.

(56) References Cited

U.S. PATENT DOCUMENTS

| | | | |
|---|---|---|---|
| 5,530,651 A * | 6/1996 | Uemura | B60T 7/22 180/169 |
| 7,444,241 B2 | 10/2008 | Grimm | |
| 2007/0152804 A1 * | 7/2007 | Breed | B60N 2/2863 340/435 |
| 2009/0276135 A1 | 11/2009 | Hagemann et al. | |
| 2012/0068859 A1 * | 3/2012 | Mochizuki | G08G 1/161 340/903 |
| 2012/0221168 A1 * | 8/2012 | Zeng | G08G 1/09626 701/1 |

FOREIGN PATENT DOCUMENTS

| | | |
|---|---|---|
| DE | 103 21 412 A1 | 12/2004 |
| DE | 10 2005 026 065 A1 | 12/2006 |
| DE | 10 2006 029 995 A1 | 1/2008 |
| DE | 11 2006 003 277 T5 | 10/2008 |
| DE | 10 2007 029 483 A1 | 1/2009 |
| DE | 10 2007 042 792 A1 | 3/2009 |
| DE | 10 2007 057 722 A1 | 6/2009 |
| DE | 10 2009 006 747 A1 | 8/2010 |

* cited by examiner

*Primary Examiner* — Helal A Algahaim
*Assistant Examiner* — Kelly D Williams
(74) *Attorney, Agent, or Firm* — Carrier Blackman & Associates, P.C.; Joseph P. Carrier; Jingli Wang (57) ABSTRACT

In an intelligent forward collision warning system that takes into account not only a first preceding vehicle traveling immediately ahead of the ego vehicle but also a second preceding vehicle traveling immediately ahead of the first preceding vehicle, a warning signal is produced upon detecting a critical state of the first or second preceding vehicle or an external condition that is predicted to cause the first preceding vehicle and the ego vehicle to be in a same lane with the first time to collision (TTC) below a prescribed value.

20 Claims, 9 Drawing Sheets

INTELLIGENT FORWARD COLLISION WARNING SYSTEM

TECHNICAL FIELD

The present invention relates to an intelligent forward collision warning system that warns a vehicle operator or applies a brake of the vehicle when there is a risk of overtaking a preceding vehicle in a same lane in a very short time, and in particular to an intelligent forward collision warning system that additionally takes into account the presence of a second preceding vehicle traveling immediately ahead of the first preceding vehicle.

BACKGROUND OF THE INVENTION

There always is a risk for a traveling vehicle to crash into a preceding vehicle if the preceding vehicle makes an unexpected deceleration or stop and/or if the vehicle operator of the ego vehicle fails to maintain a safe headway distance to the preceding vehicle. To reduce such a risk, it has been proposed to use a radar to detect the headway distance to a preceding vehicle and the relative speed between the preceding vehicle and the ego vehicle, and compute the time to collision (TTC) or the time required for the ego vehicle to reach the preceding vehicle when the current ego vehicle speed is maintained. If the TTC falls below a prescribed threshold value, an alarm may be issued to encourage the vehicle operator to reduce the speed. It is also possible to activate the brake of the ego vehicle upon detection of such an event or an event where the ego vehicle could collide with the preceding vehicle.

Typically, the TTC can be given by the following formula:

$$TTC = Xr/Vr = (Xp - Xe)/(Vp - Ve)$$

where Xr: relative distance between the ego vehicle and the preceding vehicle
Xp: position of the preceding vehicle along the road
Xe: position of the ego vehicle along the road
Vr: relative speed between the ego vehicle and the preceding vehicle
Vp: traveling speed of the preceding vehicle
Ve: traveling speed of the ego vehicle.

It is known that a serious accident often occurs when a preceding vehicle collides with another preceding vehicle traveling immediately ahead of the preceding vehicle for a certain reason, and the resulting sudden stopping or deceleration of the preceding vehicle may cause the ego vehicle to collide with the preceding vehicle. In such a situation, the preceding vehicle comes to a stop or decelerates so suddenly that it is extremely difficult for the ego vehicle to stop or decelerate quickly enough to avoid the collision with the preceding vehicle. Sometimes, this event involves a large number of vehicles resulting in a massive traffic accident called "pile-up."

There have been proposals to monitor not only the state of the first preceding vehicle travelling immediately ahead of the ego vehicle but also the state of the second preceding vehicle travelling immediately ahead of the first preceding vehicle to allow the ego vehicle to predict a deceleration of the first preceding vehicle well in advance and give the ego vehicle an ample time for taking a preventive measure.

However, if the warning is issued in an excessively conservative manner, the frequent and often premature issuance of warning may be found annoying to the vehicle operator so that the vehicle operator may lose trust in the system and may even keep the system turned off. Therefore, it is highly desirable to issue a warning only when there is a high risk for the ego vehicle to collide with the preceding vehicle. This can be accomplished by taking into account various factors that are evaluated from the road conditions and traveling conditions in determining the threshold value for issuing a warning.

BRIEF SUMMARY OF THE INVENTION

Based on such a recognition of the inventors and with the aim of eliminating the problems of the conventional forward collision warning system, a primary object of the present invention is to provide an intelligent forward collision warning system that can accurately assess the likelihood of the occurrence of a forward collision.

A second object of the present invention is to provide an intelligent forward collision warning system that is effective in preventing a forward collision and can minimize the occurrence of a false alarm.

To achieve such objects, the present invention (claim 1) provides an intelligent forward collision warning system, comprising: a detection device mounted on an ego vehicle, the detection device being configured to detect at least a first preceding vehicle immediately ahead of the ego vehicle and a second preceding vehicle immediately ahead of the first preceding vehicle; a vehicle speed sensor configured to detect a traveling speed of the ego vehicle; a first TTC computing unit for computing a time to collision for the ego vehicle in relation to the first preceding vehicle according to a speed of the first preceding vehicle determined from an output of the detection device and the traveling speed of the ego vehicle detected by the vehicle speed sensor; a second TTC computing unit for computing a second TTC given as a time to collision for the first preceding vehicle in relation to the second preceding vehicle according to the speed of the first preceding vehicle and a speed of the second preceding vehicle determined from an output of the detection device; and a determination unit for producing a warning signal upon detecting a critical state of the first or second preceding vehicle or an external condition that is predicted to cause the first preceding vehicle and the ego vehicle to be in a same lane with the first TTC below a prescribed value.

The compensation unit may be incorporated with a list of possible critical states of the first and second preceding vehicles, and configured to raise the first threshold value so that the first threshold value may be determined in an intelligent manner by taking into account various factors in addition to the relative distances and relative speeds between the ego vehicle, the first preceding vehicle and the second preceding vehicle.

According to a certain aspect of the present invention (claim 2), the critical state comprises a member selected from a group consisting of an occurrence of an event where the first preceding vehicle consists of a large vehicle, an adverse weather condition, a presence of a road construction ahead of the second preceding vehicle and an occurrence of an event where the second preceding vehicle deviates from a line of sight of the ego vehicle.

If the first preceding vehicle consists of a large vehicle, an adverse weather condition exists, a road construction is in progress ahead of the second preceding vehicle, or the second preceding vehicle deviates from a line of sight of the ego vehicle, the detection device may be unable to detect the presence or the state of the second vehicle so that there is a good chance for the first preceding vehicle to decelerate without the vehicle operator of the ego vehicle being warned in advance. Therefore, this feature reduces the possibility for the vehicle operator to be forced to decelerate the ego vehicle in an abrupt manner.

According to another aspect of the present invention (claim 3), when the first preceding vehicle is traveling in a lane adjacent to that of the ego vehicle, and the second preceding vehicle is traveling in a same lane as that of the first vehicle, the critical state comprises an event where the first TTC and the second TTC as measured without regard to the lanes are below a first threshold value and a second threshold value, respectively.

Because the first and second preceding vehicles are not traveling in the same lane as the ego vehicle, the ego vehicle is not going to collide with the preceding vehicles as long as they remain in the adjacent lane. However, if the second TTC falls below the second threshold value, there is a good chance for the first preceding vehicle to change lanes to that of the ego vehicle in an attempt to avoid crashing into the second preceding vehicle. If the predicted first TTC is below the first threshold value at such a time, the movement of the first preceding vehicle into the lane of the ego vehicle causes the first preceding vehicle to come in front of the ego vehicle at an unacceptably close distance. Therefore, it is advantageous to warn the ego vehicle as soon as the second TTC between the first and second preceding vehicle falls below the second threshold value if the predicted first TTC is smaller than the first threshold value.

According to yet another aspect of the present invention (claim 4), when the first preceding vehicle is traveling in a lane adjacent to that of the ego vehicle, and the second preceding vehicle is traveling in a lane adjacent to that of the first preceding vehicle remote from that of the ego vehicle, the critical state comprises an event where the first TTC and the second TTC as measured without regard to the lanes are below the first threshold value and the second threshold value, respectively, and the second preceding vehicle is moving toward the lane of the first preceding vehicle.

Because the first and second preceding vehicles are not traveling in the same lane as the ego vehicle, the ego vehicle is not going to collide with the preceding vehicles as long as they remain in the other lanes. However, if the second preceding vehicle changes lanes to that of the first preceding vehicle such that the second TTC is below the second threshold value, there is a good chance for the first preceding vehicle to change lanes to that of the ego vehicle in an attempt to avoid crashing into the second preceding vehicle. If the predicted first TTC is also below the first threshold value at such a time, the movement of the first preceding vehicle into the lane of the ego vehicle causes the first preceding vehicle to come in front of the ego vehicle at an unacceptably close distance. Therefore, it is advantageous to warn the ego vehicle as soon as the second TTC between the first and second preceding vehicle is expected to fall below the second threshold value if the predicted first TTC is smaller than the first threshold value.

A similar situation arises (claim 5) when the first preceding vehicle is traveling in a lane adjacent to that of the ego vehicle, and the second preceding vehicle is traveling in a same lane as that of the ego vehicle, the critical state comprises an event where the first TTC and the second TTC as measured without regard to the lanes are below the first threshold value and the second threshold value, respectively, and the second preceding vehicle is moving toward the lane of the first preceding vehicle.

According to yet another aspect of the present invention (claim 6), when the first preceding vehicle is traveling in a lane adjacent to that of the ego vehicle, and the second preceding vehicle is traveling in a same lane as that of the ego vehicle, the critical state comprises an event where the first TTC and the second TTC as measured without regard to the lanes are below the first threshold value and the second threshold value, respectively, and the first preceding vehicle is moving toward the lane of the ego vehicle.

The headway distance between the second preceding vehicle and the ego vehicle may be great enough to cause no alarming situation, and the ego vehicle is not going to collide with the preceding vehicles as long as they remain in their respective lanes. However, if the first preceding vehicle moves into the same lane as the second preceding vehicle and the ego vehicle between the second preceding vehicle and the ego vehicle while the predicted first TTC and the predicted second TTC are below the first threshold value and the second threshold value, respectively, it is highly probable for the first preceding vehicle to come in front of the ego vehicle at an unacceptably close distance. Therefore, it is advantageous to warn the ego vehicle at such a time as soon as the movement of the first preceding vehicle toward the lane of the ego vehicle is detected.

According to yet another aspect of the present invention (claim 7), when the first preceding vehicle is traveling in a same lane as the ego vehicle, and a second preceding vehicle is approaching the lane of the first preceding vehicle from a merging lane or road, the critical state comprises an event where the first TTC and the second TTC as measured without regard to the lanes are below the first threshold value and the second threshold value, respectively.

In this case also, as there is a good chance for the first preceding vehicle to decelerate, it is advantageous to warn the ego vehicle as soon as the presence of the second preceding vehicle is detected. A similar situation arises (claim 8) also when the first preceding vehicle is traveling in a lane adjacent to that of the ego vehicle, instead of the same lane as the ego vehicle.

According to yet another aspect of the present invention (claim 9), when the first preceding vehicle is traveling in a same lane as the ego vehicle, and the second preceding vehicle is in a road directly intersecting with the lane of the first preceding vehicle adjacent thereto, the critical state comprises an event where the first TTC and the second TTC as measured without regard to the lanes are below the first threshold value and the second threshold value, respectively.

In this case also, as there is a good chance for the first preceding vehicle to decelerate, it is advantageous to warn the ego vehicle as soon as the presence of the second preceding vehicle is detected which may be either moving or stationary. A similar situation arises (claim 10) also when the first preceding vehicle is traveling in a lane adjacent to that of the ego vehicle, instead of the same lane as the ego vehicle.

According to yet another aspect of the present invention (claim 11), when the first and second vehicles are traveling in a same lane as the ego vehicle, and a third preceding vehicle is traveling in a lane adjacent to that of the first preceding vehicle at such a position as to prevent the first preceding vehicle to change lanes to the adjacent lane, the critical state comprises an event where the first TTC and the second TTC are below a first threshold value and a second threshold value, respectively.

In this case, the first preceding vehicle has no choice but to decelerate if the vehicle operator of the first preceding vehicle considers that the second TTC is too small for the vehicle operator to feel comfortable as the first preceding vehicle is unable to change lanes. Therefore, it is advantageous for the ego vehicle to maintain a relatively large headway distance to the first preceding vehicle. Preferably, the first threshold value may be increased from the normal first threshold value as a precautionary measure.

In any of the various embodiments, the determination unit may be configured to control a forward collision mitigation system or a forward collision avoidance system, and to issue a visual and/or auditory alarm to a vehicle operator.

BRIEF DESCRIPTION OF THE DRAWINGS

Now the present invention is described in the following with reference to the appended drawings, in which.

DETAILED DESCRIPTION OF THE PREFERRED EMBODIMENT(S)

Figure 1:
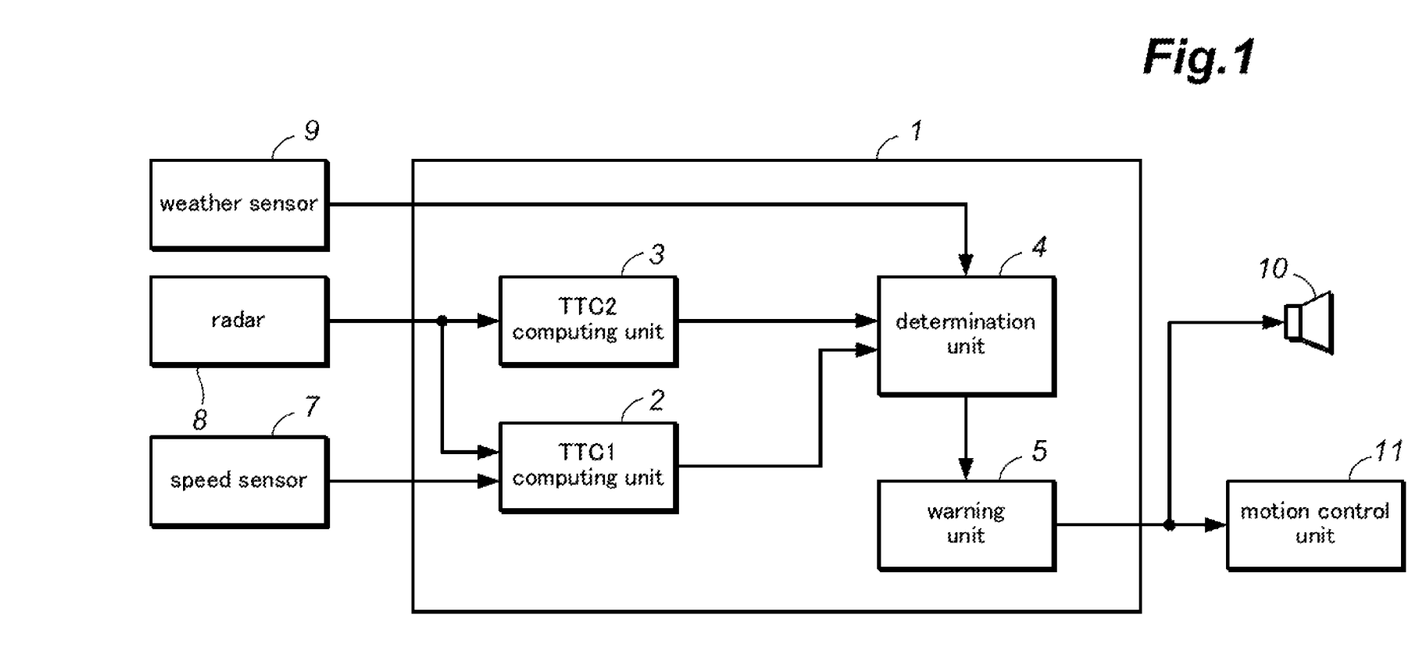
FIG. 1 is a functional block diagram of an intelligent forward collision warning system embodying the present invention.

The intelligent forward collision warning system shown in FIG. 1 comprises a main control unit 1 which essentially consists of a microcomputer configured to operate under a computer program, and the various functional units in the main control unit 1 are typically implemented by particular modes of operation of the microcomputer.

The main control unit 1 comprises a first TTC computing unit 2 which computes a first TTC (time to collision) or TTC1 as a time period in which an ego vehicle E collides with a preceding vehicle I if the two vehicles continue to travel under the given current conditions. The first TTC computing unit 2 receives an input signal from a radar 8 which is capable of detecting preceding vehicles such as a first preceding vehicle I (a vehicle immediately preceding the ego vehicle E), a second preceding vehicle II (a vehicle immediately preceding the first preceding vehicle I) and other preceding vehicles located possibly in other lanes within the detection range thereof, as well as an input signal from a vehicle speed sensor 7 for detecting the traveling speed of the ego vehicle E.

Figure 2:
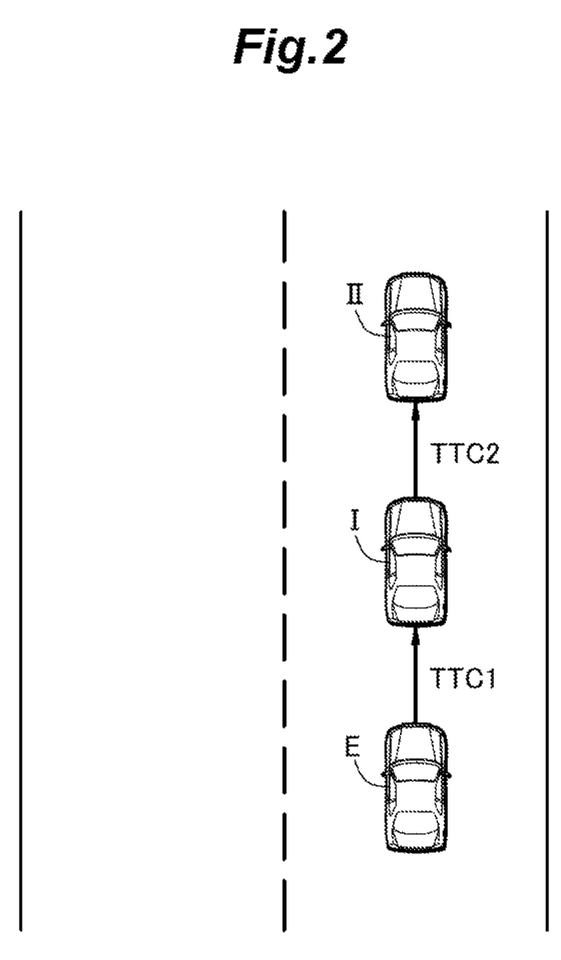
FIG. 2 is a schematic diagram showing a first mode or a basic mode of operation of the embodiment shown in FIG. 1.

In this embodiment, the radar 8 is capable of detecting not only vehicles traveling ahead of the ego vehicle in the same lane but also vehicles traveling ahead of the ego vehicle in an adjacent lane or even a merging lane or road. FIG. 2 shows a basic state where an ego vehicle E, a first preceding vehicle I and a second preceding vehicle II are traveling all in a same lane. According to the current traveling speed of the ego vehicle E detected by the vehicle speed sensor 7 and the position and the traveling speed of the first preceding vehicle I traveling immediately ahead of the ego vehicle E, the first TTC computing unit 2 computes a first TTC (TTC1) which is given as a TTC between the ego vehicle E and the first preceding vehicle I in the same lane (or another lane). The main control unit 1 further comprises a second TTC computing unit 3 configured to compute a second TTC (TTC2) which is given as a TTC between the first preceding vehicle I and the second preceding vehicle II in the same lane (or in different lanes) according to the detection signal from the radar 8.

The output signals of the first and second TTC computing units 2 and 3 are forwarded to a determination unit 4 which, optionally taking into account information supplied from a weather sensor 9 for detecting various weather or other road conditions, triggers a warning unit 5 when there is a risk of a forward collision of the ego vehicle according to the various TTC values supplied from the TTC computing units 2 and 3. The warning unit 5 may simply activate a visual and/or auditory alarm 10, and may alternatively or additionally activate a motion control unit 11 of the vehicle to decelerate the vehicle when required.

FIG. 2 shows a basic mode of operation of the illustrated embodiment of the intelligent forward collision warning system. In this example and the other examples given in the following, it is assumed that the vehicles travel on the right hand side of the road as in most part of Europe and the Americas. For countries where vehicles travel on the left hand side of the road as in the UK and Japan, the drawings may be reversed (into a mirror image) and the description should be interpreted in a corresponding manner.

An ego vehicle E is traveling immediately behind a first preceding vehicle I in the same lane (right lane in this case). Suppose that there is no other vehicle ahead of the first preceding vehicle. The first TTC computing unit 2 computes a first TTC or TTC1, and compares TTC1 with a threshold TTC1 value, and triggers the warning unit 5 when TTC1 falls below the threshold TTC1 value. The threshold TTC1 value may be set in two stages, for instance, such that a visual and/or auditory warning is issued when TTC1 falls below a first threshold TTC value and a brake is applied when TTC1 falls below a second threshold TTC value which is smaller than the first threshold TTC value.

If there is a second preceding vehicle II traveling immediately ahead of the first preceding vehicle I in the same lane, the determination unit 4 takes this into account and increases the threshold TTC1 value (and/or reduces the first TTC) depending on the magnitude of the second TTC or TTC2. If TTC2 is smaller than a threshold TTC2 value, there is an increased chance of the first preceding vehicle I to decelerate, possibly in an abrupt manner. Therefore, to cope with such an eventuality, the determination unit 4 increases the threshold TTC1 value when TTC2 is smaller than the threshold TTC2 value so that the warning unit 5 may be triggered with a greater margin of safety.

When the first preceding vehicle I is a truck or other large vehicle which may prevent the radar 8 to accurately detect the second preceding vehicle II if there is any, the determination unit 4 takes this into account and increases the threshold TTC1 value. In such a case, as the first preceding vehicle I may abruptly decelerate due to the road condition ahead of the first preceding vehicle I or the presence of a second preceding vehicle II which is unknown to the ego vehicle E, the determination unit 4 increases the threshold TTC1 value so that even in such an eventuality, the warning unit 5 may be triggered with an appropriate margin of safety.

The determination unit 4 also takes into account the weather and road conditions according to the signal from the weather sensor 9. The weather sensor 9 may consist of a simple weather sensor which is capable of detecting rain, snow, fog and other weather conditions, or may consist of a radio or telephone unit configured to receive the weather and road information from a central broadcast station. Upon identifying any weather or road condition which may affect the capability of the vehicle operator to decelerate the vehicle or bring the vehicle to a stop or increase the possibility of any preceding vehicle to abruptly decelerate, the determination unit 4 takes this into account and increases the threshold TTC1 value to compensate for a greater time period required for the vehicle operator to decelerate the vehicle in such a case. Such weather and road conditions may include not only normal weather conditions such as rain, snow, fog, wind and dust, but road conditions such as road construction, road narrowing, tunnel and so forth.

Figure 3:
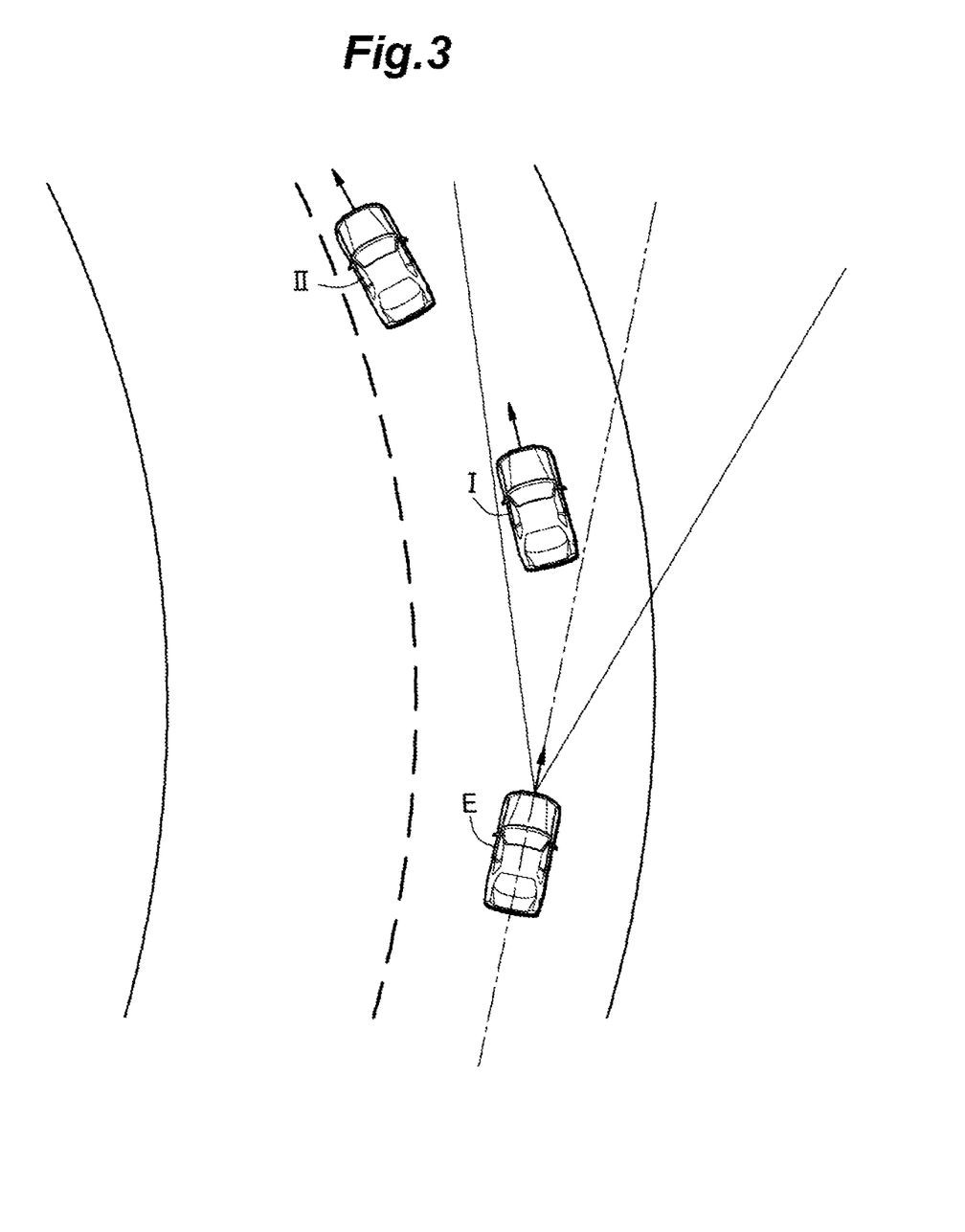
FIG. 3 is a schematic diagram showing a second mode of operation of the embodiment shown in FIG. 1.

FIG. 3 shows an example in which because of the curving of the lane or road in which the vehicles are traveling, the presence or the state of the second preceding vehicle II may not be detected by the ego vehicle E. This event may be detected by the radar 8 of the ego vehicle E as an abrupt failure to detect the second preceding vehicle II. Alternatively, the main control unit 1 may detect the curvature of the road from GPS or other information obtained from an external source. In such a case, the main control unit 1 is unable to compute the second TTC (TTC2), and there is a chance that TTC2 may be dangerously reduced while the vehicles are traveling the curved road because the main control unit 1 is unable to accurately detect the state of the second preceding vehicle II. Therefore, when the second preceding vehicle II goes out of the range of sight of the ego vehicle E, it is desirable to increase the threshold TTC1 value, and increase a margin of safety.

Figure 4:
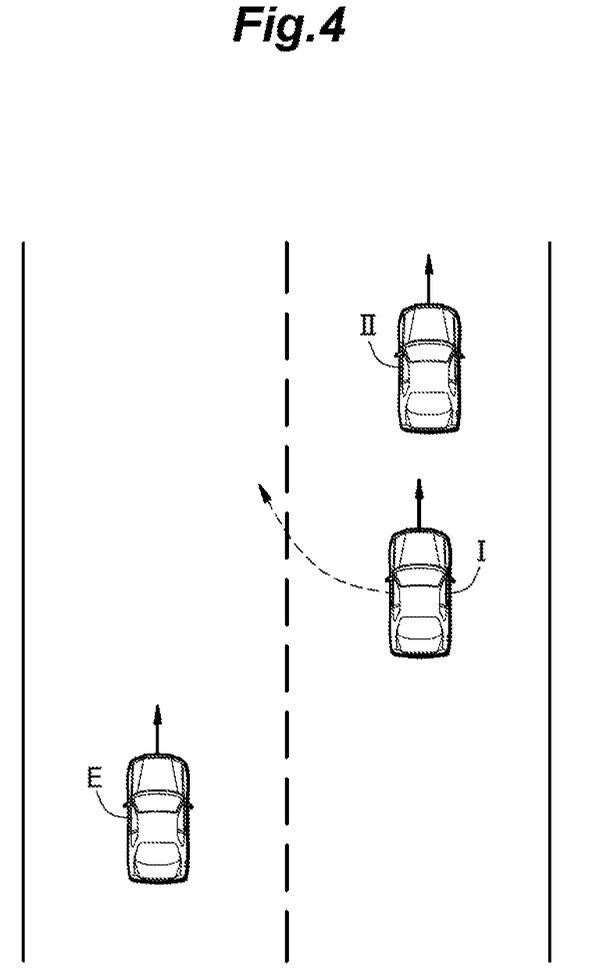
FIG. 4 is a schematic diagram showing a third mode of operation of the embodiment shown in FIG. 1.

In the example shown in FIG. 4, the first preceding vehicle I is traveling in a lane adjacent to that in which the ego vehicle E is traveling. In such a case, if no factor is detected that may cause the first preceding vehicle I to change lanes to the one in which the ego vehicle E is traveling, the determination unit 4 takes no action. However, in this example, there is a second preceding vehicle II traveling immediately ahead of the first preceding vehicle I in the same lane as the first preceding vehicle I. In this case, the first preceding vehicle I is highly likely to change lanes to the one in which the ego vehicle E is traveling, possibly in an abrupt manner, particularly when the second TTC falls below a certain threshold value. In view of such an eventuality, the determination unit 4 triggers the warning unit 5 when the second preceding vehicle II is detected to be within a certain distance from the first preceding vehicle I such that the second TTC between the first and second preceding vehicles I and II is within a certain prescribed value and the first TTC between the ego vehicle E and the first preceding vehicle I is within a threshold value. If desired, the threshold value for the first TTC may be increased in dependence on the magnitude of the second TTC. For instance, the smaller the second TTC is, the greater may be the threshold value for the first TTC.

Figure 5:
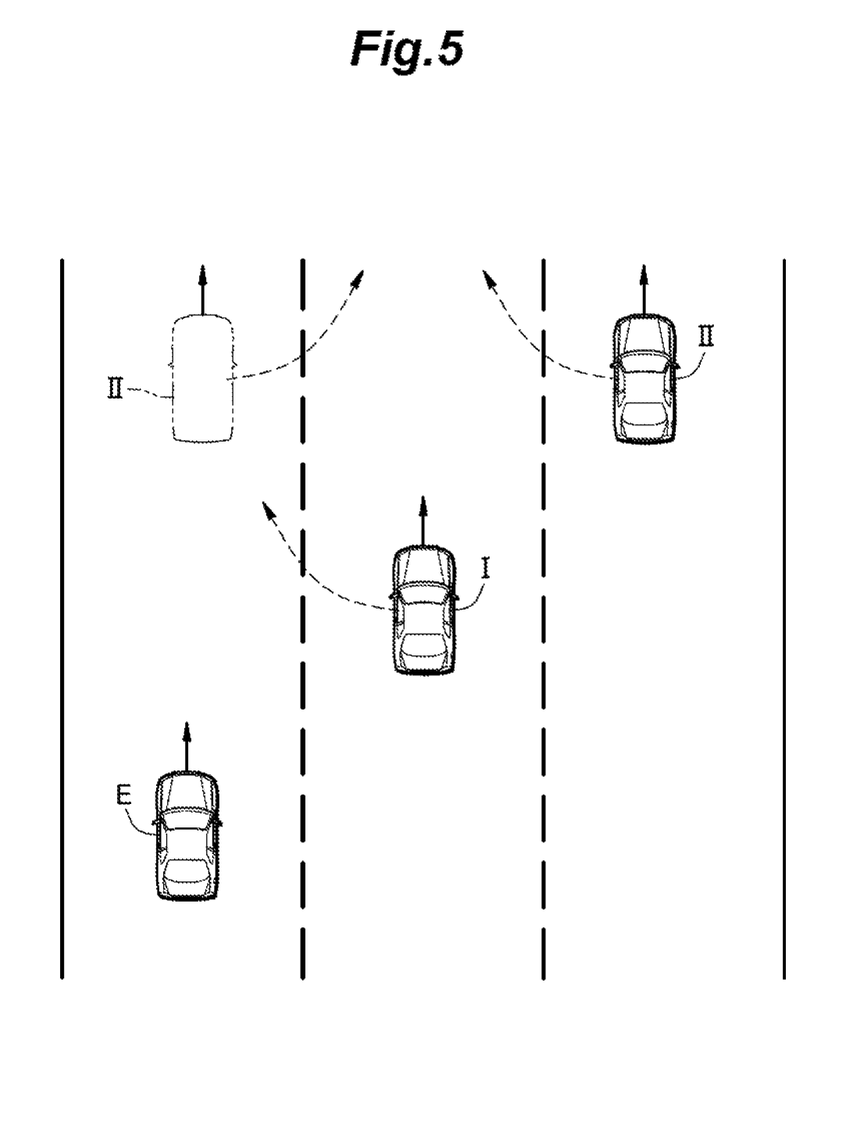
FIG. 5 is a schematic diagram showing a fourth mode of operation of the embodiment shown in FIG. 1.

FIG. 5 shows an extension of the example illustrated in FIG. 4. A first preceding vehicle I is traveling immediately ahead of the ego vehicle E in a lane adjacent to that of the ego vehicle E. Again, if no factor is detected that may cause the first preceding vehicle I to change lanes to the one in which the ego vehicle E is traveling, the determination unit 4 takes no action. However, in this example, there is a second preceding vehicle II traveling immediately ahead of the first preceding vehicle I in a lane adjacent to the lane of the first preceding vehicle I remote from the lane of the ego vehicle E. A similar situation arises also when the second preceding vehicle II is traveling in the same lane as the ego vehicle E as indicated by the imaginary lines in FIG. 5.

In either case, when the movement of the second preceding vehicle II into that of the first preceding vehicle I is detected, the first preceding vehicle I is highly likely to change lanes to the one in which the ego vehicle E is traveling, possibly in an abrupt manner, particularly when the predicted second TTC falls below a certain threshold value. In view of such an eventuality, the determination unit 4 triggers the warning unit 5 when the second preceding vehicle II is detected to come within a certain distance from the first preceding vehicle I such that the second TTC between the first and second preceding vehicles I and II is within a certain prescribed value and the first TTC between the ego vehicle E and the first preceding vehicle I is within a threshold value. If desired, the threshold value for the first TTC may be increased in dependence on the magnitude of the second TTC. For instance, the smaller the second TTC is, the greater may be the threshold value for the first TTC.

Figure 6:
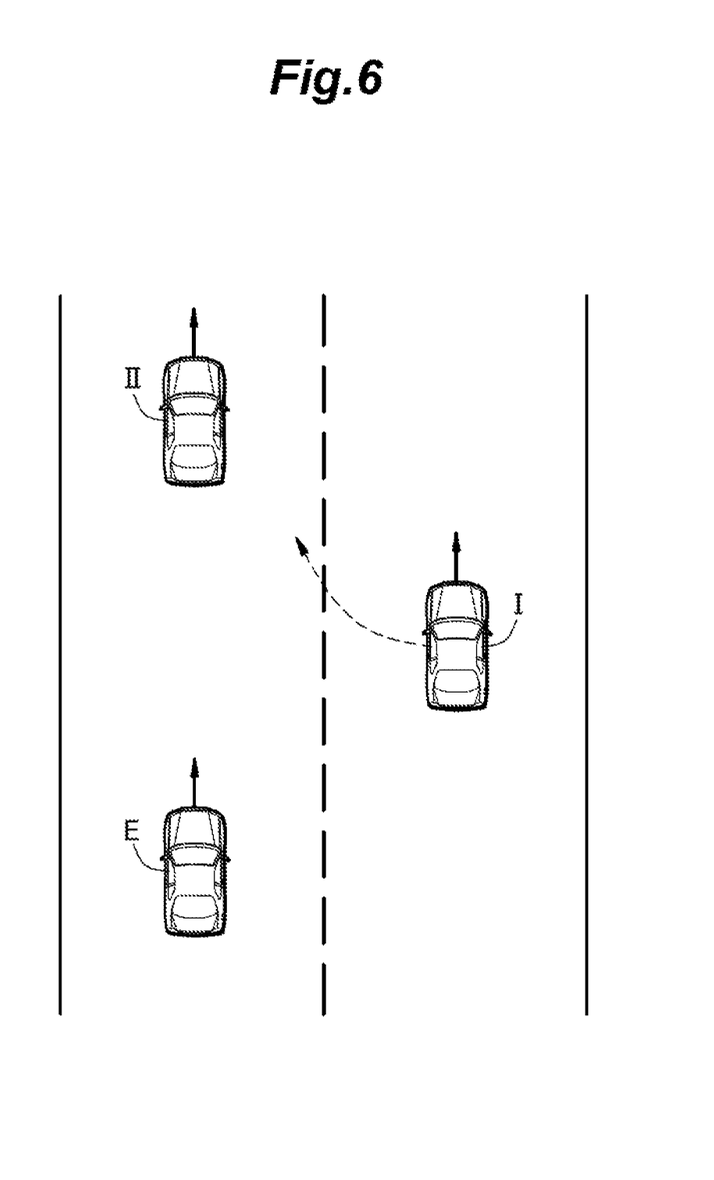
FIG. 6 is a schematic diagram showing a fifth mode of operation of the embodiment shown in FIG. 1.

FIG. 6 shows another modification of the example illustrated in FIG. 4. The first preceding vehicle I is traveling in a lane adjacent to that of the ego vehicle E, and the second preceding vehicle II is traveling further ahead of the first preceding vehicle I but in the lane of the ego vehicle E which is adjacent to the lane of the first preceding vehicle I. If the second preceding vehicle II is traveling well ahead of the ego vehicle E, and there is no indication that the first preceding vehicle I is about to change lanes, the determination unit 4 takes no action.

However, if the radar 8 detects any movement of the first preceding vehicle I toward the lane of the ego vehicle E, the determination unit 4 evaluates or predicts what will be the first TTC and the second TTC once the first preceding vehicle I has changed lanes to the one in which the ego vehicle E is traveling. If the predicted first TTC is smaller than a threshold TTC1 value which takes into account the predicted second TTC or is given as a mathematical function of the predicted second TTC, the determination unit 4 triggers the warning unit 5 and issues a warning from the alarm 10 and/or activates the motion control unit 11 so as to decelerate the ego vehicle E to an appropriate level.

Figure 7:
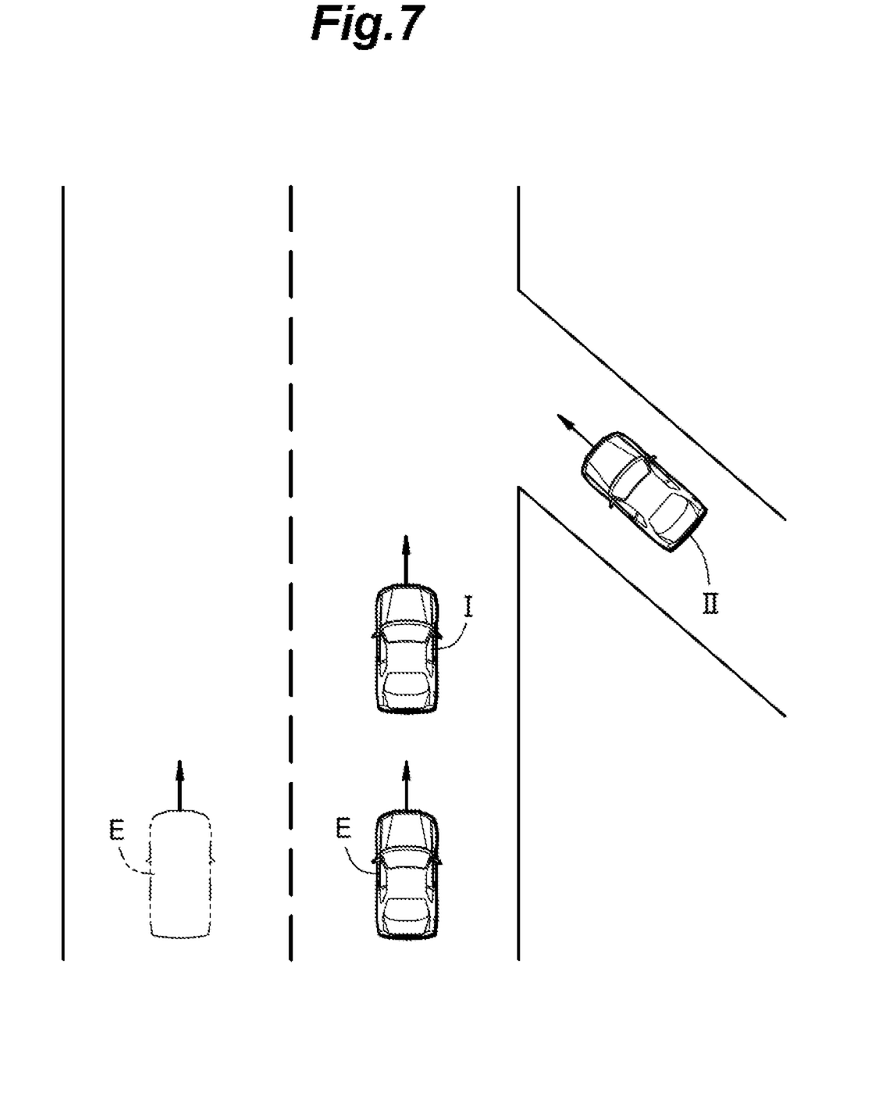
FIG. 7 is a schematic diagram showing a sixth mode of operation of the embodiment shown in FIG. 1.

FIG. 7 shows yet another example of the mode of operation of the intelligent forward collision warning system embodying the present invention. Suppose that the ego vehicle E is following a first preceding vehicle I in a same lane. A second preceding vehicle II is traveling in a merging road or lane, and is expected to occupy the same lane as the first preceding vehicle I some distance ahead of the first preceding vehicle I. The first and second TTC computing units 2 and 3 compute the predicted first TTC and second TTC before the second preceding vehicle II has actually merged into the lane of the first preceding vehicle I. If the first TTC is smaller than a threshold TTC1 value which takes into account the predicted second TTC or is given as a mathematical function of the predicted second TTC, the determination unit 4 triggers the warning unit 5 and issues a warning from the alarm 10 and/or activates the motion control unit 11 so as to decelerate the ego vehicle E to an appropriate level.

FIG. 7 also shows a modification of the preceding example. In this case, the ego vehicle E as indicated by imaginary lines is traveling in a lane adjacent to that of the first preceding vehicle I which is remote from the side of the merging lane in which the second preceding vehicle II is traveling. In this case, it is highly likely for the first preceding vehicle I to change lanes to that of the ego vehicle E particularly when the second preceding vehicle II is expected to cause a second TTC which is smaller than a certain threshold value.

The first and second TTC computing units 2 and 3 compute the predicted first TTC and second TTC before the second preceding vehicle II has actually merged into the lane of the first preceding vehicle I or before the first preceding vehicle I has changed lanes to that of the ego vehicle E. If the predicted first TTC is smaller than a threshold TTC1 value which takes into account the predicted second TTC or is given as a mathematical function of the predicted second TTC, the determination unit 4 triggers the warning unit 5 and issues a warning from the alarm 10 and/or activates the motion control unit 11 so as to decelerate the ego vehicle E to an appropriate level.

Figure 8:
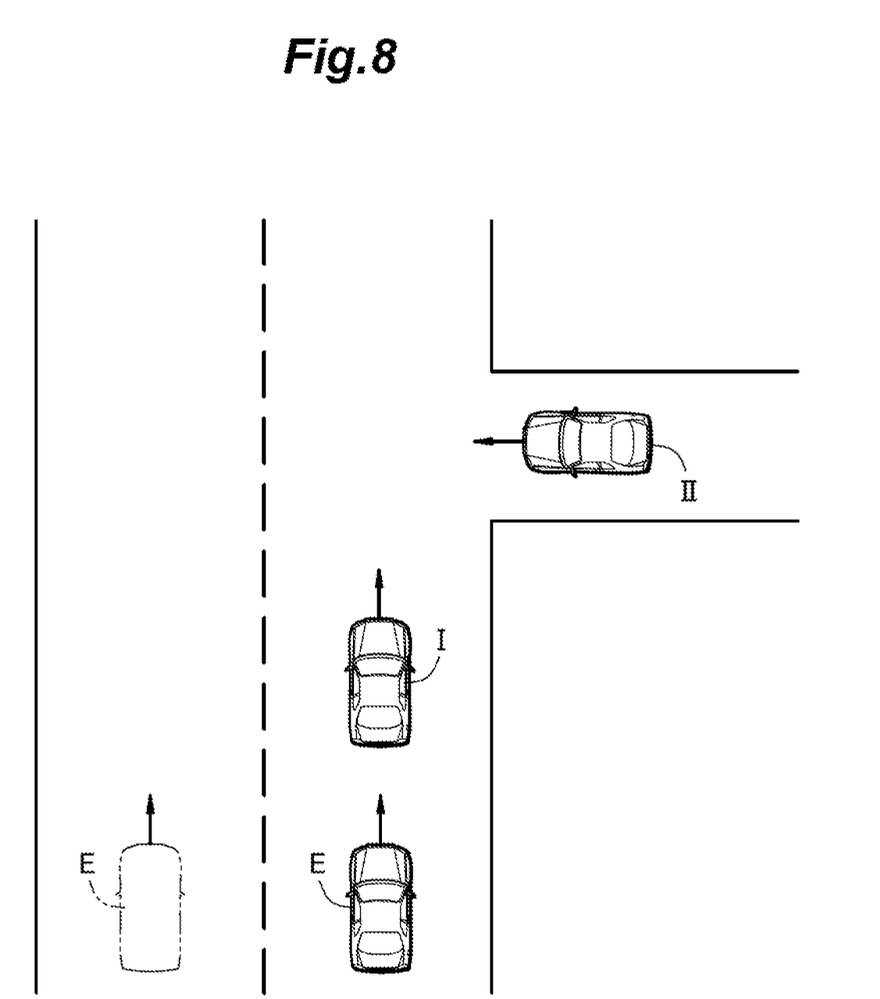
FIG. 8 is a schematic diagram showing a seventh mode of operation of the embodiment shown in FIG. 1.

In the example illustrated in FIG. 8, the ego vehicle E is following a first preceding vehicle I in a same lane. A second preceding vehicle II is either standing at or approaching a connecting road or lane which is directly connected to or intersect the road or the lane in which the ego vehicle E and the first preceding vehicle I are traveling. Typically, the first preceding vehicle I decelerates in anticipation of the second preceding vehicle II possibly advancing to the road or lane in which the ego vehicle E and the first preceding vehicle I are traveling. The second preceding vehicle II may be required to stand at the intersection until the ego vehicle E and the first preceding vehicle I have passed the intersection, but the first preceding vehicle I is recommended to take a precaution in case the second preceding vehicle II may fail to yield the right of way to the first preceding vehicle I and the ego vehicle E.

The determination unit 4 takes this into account and increases the threshold TTC1 value between the first preceding vehicle I and the ego vehicle E because it is highly likely for the first preceding vehicle I to decelerate. Thereby, the headway distance between the first preceding vehicle I and the ego vehicle E is maintained at a comfortable level for the vehicle operator of the ego vehicle E even when the first preceding vehicle I decelerates from the normal cruising speed.

FIG. 8 also shows a modification of the preceding example. In this case, the ego vehicle E as indicated by the imaginary lines is traveling in a lane adjacent to that of the first preceding vehicle I which is remote from the connecting road or lane in which the second preceding vehicle II is traveling or standing. In this case, it is highly likely for the first preceding vehicle I to change lanes to that of the ego vehicle E.

The first and second TTC computing units 2 and 3 compute the predicted first TTC and second TTC before the first preceding vehicle I has changed lanes to that of the ego vehicle E without regard to the movement of the second preceding vehicle II which may or may not yield the right of way to the first preceding vehicle I. If the first TTC is smaller than a threshold TTC1 value which takes into account the second TTC or is given as a mathematical function of the second TTC, the determination unit 4 triggers the warning unit 5 and issues a warning from the alarm 10 and/or activates the motion control unit 11 so as to decelerate the ego vehicle E to an appropriate level.

Figure 9:
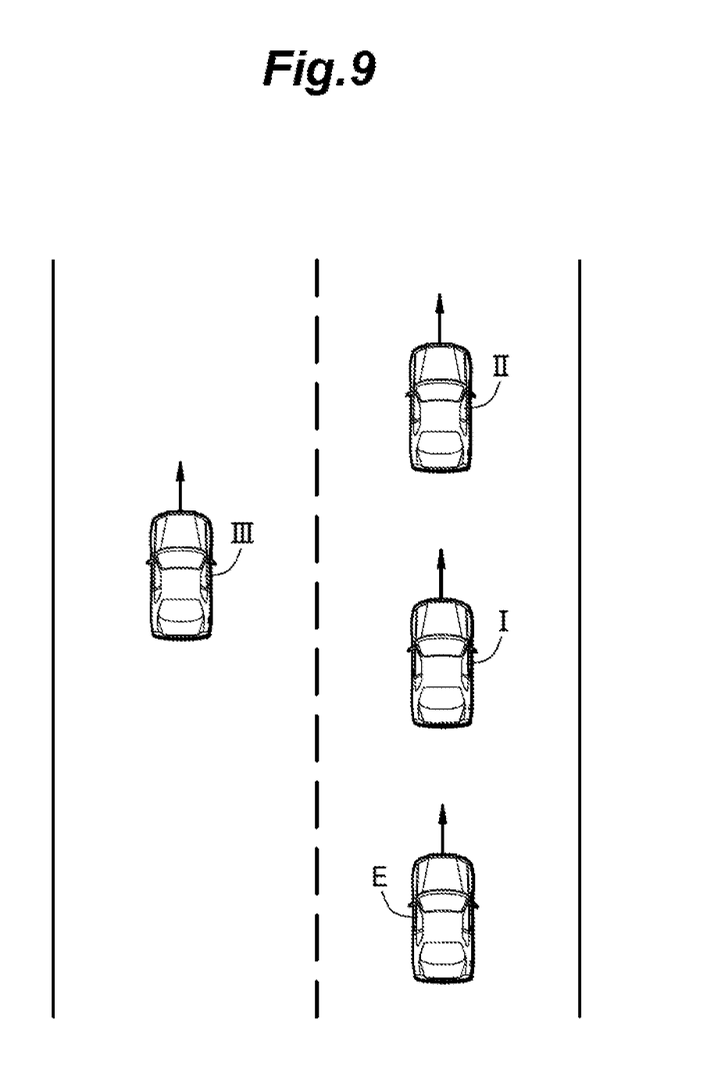
FIG. 9 is a schematic diagram showing an eighth mode of operation of the embodiment shown in FIG. 1.

In the example illustrated in FIG. 9, the ego vehicle E is following a first preceding vehicle I which is in turn following a second preceding vehicle II all in a same line. Additionally, a third preceding vehicle III is traveling in an adjacent lane, obliquely ahead of the ego vehicle E. The third preceding vehicle III is located in such a manner as to prevent the first preceding vehicle I from changing lanes from the current one to the adjacent one. Therefore, even when the second TTC reduces to such an extent that the driver of the first preceding vehicle I wishes to change lanes, the first preceding vehicle I is unable to change lanes so that the vehicle operator of the first preceding vehicle I has no choice but to reduce the speed of the vehicle, possibly in an abrupt manner. Based on such a consideration, the determination unit 4 increases the threshold TTC1 value in such a situation so that the ego vehicle E may be decelerated in an adequately early stage in anticipation of an abrupt deceleration of the first preceding vehicle I, and the warning unit 5 may be triggered with an appropriate margin of safety.

The present invention was described in terms of a specific embodiment which is configured to operate in a number of different modes, but the present invention is not limited by the illustrated embodiment or the illustrated modes of operation, and can be changed in various details thereof without departing from the spirit of the present invention. For example, instead of or in addition to the radar 8, the intelligent forward collision warning system may include an ultrasonic sonar and/or a laser detection device as a detection device that detects preceding vehicles. Further, the intelligent forward collision warning system may include a video sensor serving as the detection device, where the video sensor detects preceding vehicles by analyzing a scene in front of the ego vehicle recorded by a video camera. The motion control unit 5 may be of any known type and may be configured to serve as a forward collision mitigation system or a forward collision avoidance system.

The invention claimed is:

1. An intelligent forward collision warning system, comprising:
   a detection device mounted on an ego vehicle, the detection device being configured to detect at least a first preceding vehicle immediately ahead of the ego vehicle and a second preceding vehicle immediately ahead of the first preceding vehicle;
   a vehicle speed sensor configured to detect a traveling speed of the ego vehicle;
   a first time to collision (TTC) computing unit for computing a first TTC given as a time to collision for the ego vehicle in relation to the first preceding vehicle according to a speed of the first preceding vehicle determined from an output of the detection device and the traveling speed of the ego vehicle detected by the vehicle speed sensor;
   a second TTC computing unit for computing a second TTC given as a time to collision for the first preceding vehicle in relation to the second preceding vehicle according to the speed of the first preceding vehicle and a speed of the second preceding vehicle determined from an output of the detection device; and
   a determination unit for producing a warning signal upon detecting a critical state of the first or second preceding vehicle:
   wherein when the first preceding vehicle is traveling in a lane adjacent to that of the ego vehicle, and the second preceding vehicle is traveling in a lane adjacent to that of the first preceding vehicle remote from that of the ego vehicle or in a same lane as that of the ego vehicle, the critical state comprises an event where the first TTC and the second TTC as measured without regard to the lanes are below a first threshold value and a second threshold value, respectively, and the second preceding vehicle is moving toward the lane of the first preceding vehicle.

2. The intelligent forward collision warning system according to claim 1, wherein the detection device comprises an electromagnetic radar, an ultrasonic sonar or a laser detection device.

3. The intelligent forward collision warning system according to claim 1, wherein the detection device comprises a video sensor.

4. The intelligent forward collision warning system according to claim 1, wherein the determination unit is configured to control a forward collision mitigation system or a forward collision avoidance system.

5. The intelligent forward collision warning system according to claim 1, wherein the determination unit is configured to issue a visual and/or auditory alarm to a vehicle operator.

6. An intelligent forward collision warning system, comprising:
 a detection device mounted on an ego vehicle, the detection device being configured to detect at least a first preceding vehicle immediately ahead of the ego vehicle and a second preceding vehicle immediately ahead of the first preceding vehicle;
 a vehicle speed sensor configured to detect a traveling speed of the ego vehicle;
 a first time to collision (TTC) computing unit for computing a first TTC given as a time to collision for the ego vehicle in relation to the first preceding vehicle according to a speed of the first preceding vehicle determined from an output of the detection device and the traveling speed of the ego vehicle detected by the vehicle speed sensor;
 a second TTC computing unit for computing a second TTC given as a time to collision for the first preceding vehicle in relation to the second preceding vehicle according to the speed of the first preceding vehicle and a speed of the second preceding vehicle determined from an output of the detection device; and
 a determination unit for producing a warning signal upon detecting a critical state of the first or second preceding vehicle:
 wherein when the first preceding vehicle is traveling in a lane adjacent to that of the ego vehicle, and the second preceding vehicle is traveling in a same lane as that of the ego vehicle, the critical state comprises an event where the first TTC and the second TTC as measured without regard to the lanes are below a first threshold value and a second threshold value, respectively, and the first preceding vehicle is moving toward the lane of the ego vehicle.

7. The intelligent forward collision warning system according to claim 6, wherein the detection device comprises an electromagnetic radar, an ultrasonic sonar or a laser detection device.

8. The intelligent forward collision warning system according to claim 6, wherein the detection device comprises a video sensor.

9. The intelligent forward collision warning system according to claim 6, wherein the determination unit is configured to control a forward collision mitigation system or a forward collision avoidance system.

10. The intelligent forward collision warning system according to claim 6, wherein the determination unit is configured to issue a visual and/or auditory alarm to a vehicle operator.

11. An intelligent forward collision warning system, comprising:
 a detection device mounted on an ego vehicle, the detection device being configured to detect at least a first preceding vehicle immediately ahead of the ego vehicle and a second preceding vehicle immediately ahead of the first preceding vehicle;
 a vehicle speed sensor configured to detect a traveling speed of the ego vehicle;
 a first time to collision (TTC) computing unit for computing a first TTC given as a time to collision for the ego vehicle in relation to the first preceding vehicle according to a speed of the first preceding vehicle determined from an output of the detection device and the traveling speed of the ego vehicle detected by the vehicle speed sensor;
 a second TTC computing unit for computing a second TTC given as a time to collision for the first preceding vehicle in relation to the second preceding vehicle according to the speed of the first preceding vehicle and a speed of the second preceding vehicle determined from an output of the detection device; and
 a determination unit for producing a warning signal upon detecting a critical state of the first or second preceding vehicle:
 wherein when the first preceding vehicle is traveling in a same lane as the ego vehicle or in a lane adjacent to that of the ego vehicle, and a second preceding vehicle is approaching the lane of the first preceding vehicle from a merging lane or road, the critical state comprises an event where the first TTC and the second TTC as measured without regard to the lanes are below a first threshold value and a second threshold value, respectively.

12. The intelligent forward collision warning system according to claim 11, wherein the detection device comprises an electromagnetic radar, an ultrasonic sonar or a laser detection device.

13. The intelligent forward collision warning system according to claim 11, wherein the detection device comprises a video sensor.

14. The intelligent forward collision warning system according to claim 11, wherein the determination unit is configured to control a forward collision mitigation system or a forward collision avoidance system.

15. The intelligent forward collision warning system according to claim 11, wherein the determination unit is configured to issue a visual and/or auditory alarm to a vehicle operator.

16. An intelligent forward collision warning system, comprising:
 a detection device mounted on an ego vehicle, the detection device being configured to detect at least a first preceding vehicle immediately ahead of the ego vehicle and a second preceding vehicle immediately ahead of the first preceding vehicle;
 a vehicle speed sensor configured to detect a traveling speed of the ego vehicle;
 a first time to collision (TTC) computing unit for computing a first TTC given as a time to collision for the ego vehicle in relation to the first preceding vehicle according to a speed of the first preceding vehicle determined from an output of the detection device and the traveling speed of the ego vehicle detected by the vehicle speed sensor;
 a second TTC computing unit for computing a second TTC given as a time to collision for the first preceding vehicle in relation to the second preceding vehicle according to the speed of the first preceding vehicle and a speed of the second preceding vehicle determined from an output of the detection device; and a determination unit for producing a warning signal upon detecting a critical state of the first or second preceding vehicle:

wherein when the first preceding vehicle is traveling in a same lane as the ego vehicle or in a lane adjacent to that of the ego vehicle, and the second preceding vehicle is in a road directly intersecting with the lane of the first preceding vehicle adjacent thereto, the critical state comprises an event where the first TTC and the second TTC as measured without regard to the lanes are below a first threshold value and a second threshold value, respectively.

17. The intelligent forward collision warning system according to claim 16, wherein the detection device comprises an electromagnetic radar, an ultrasonic sonar or a laser detection device.

18. The intelligent forward collision warning system according to claim 16, wherein the detection device comprises a video sensor.

19. The intelligent forward collision warning system according to claim 16, wherein the determination unit is configured to control a forward collision mitigation system or a forward collision avoidance system.

20. The intelligent forward collision warning system according to claim 16, wherein the determination unit is configured to issue a visual and/or auditory alarm to a vehicle operator.

\* \* \* \* \*